United States Patent Office 2,814,347
Patented Nov. 26, 1957

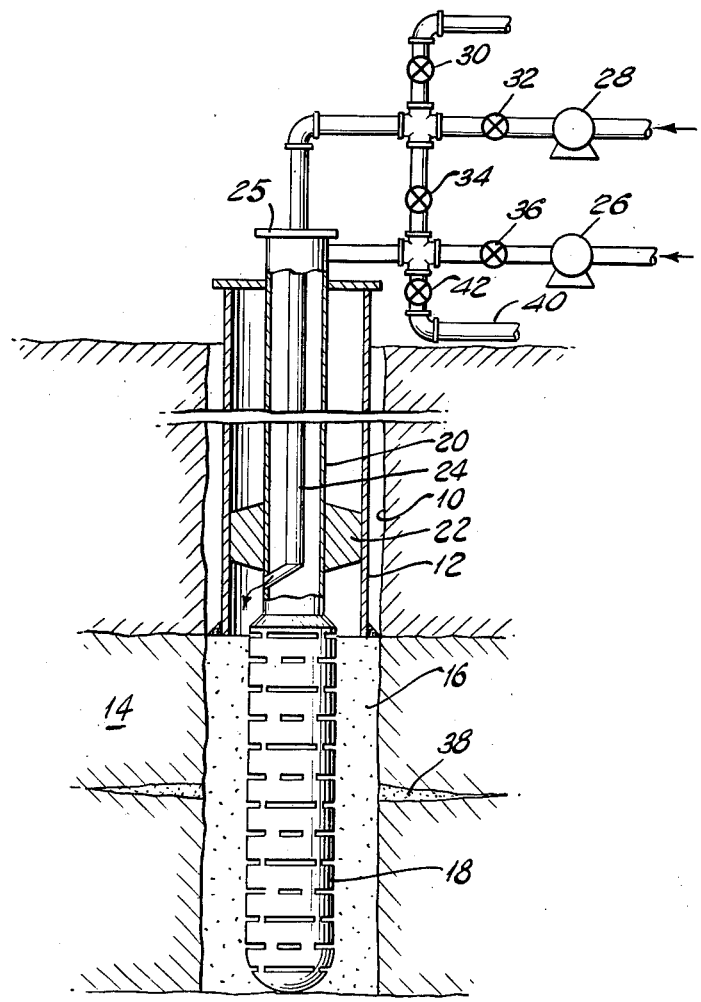

2,814,347

METHOD OF COMPLETING A WELL

John D. MacKnight, Mount Vernon, N. Y., assignor to The Texas Company, New York, N. Y., a corporation of Delaware Application December 30, 1953, Serial No. 401,159

6 Claims. (Cl. 166—42)

This invention relates to a method of completing a well, and more particularly to a method of substantially simultaneously fracturing a producing formation and providing a filter pack of granular material around the well screen or strainer. The principal object of the invention is to accomplish these results with but one passage of tools into the well and thus with a minimum time consumption.

During recent years, the hydraulic fracturing of well producing formations has come into use and this has proven effective in increasing the production, say, from an oil well by providing greater drainage area within the formation through which the oil can pass into the well cavity and then up to the surface. The "gravel packing" of wells, as is well known, also has many advantages in increasing the production from a well. Thus, when the space around a well strainer or screen is packed with a granular material, the walls of the formation are held in place and a porous mass is provided through which the oil can pass quite freely into the well screen and then to the surface. Each of these procedures, i. e., the hydraulic fracturing of a formation and the graveling of a well, requires considerable time since it is frequently necessary to run tools into and out of the well several times. In accordance with the present invention, both of these procedures are carried out effectively substantially at one time and with one run or passage of well completion equipment into the hole.

In carrying out the invention, assuming that a bore hole has been drilled into a producing formation of the type in which it is believed that the formation can be fractured, and that the hole has been cased down to the top of the producing formation, a well screen attached to the lower end of a tubing or production string is run into the hole so that the screen will be within and opposite the walls of the producing formation. The screen is preferably at least as long as the vertical height of the producing zone. The fracturing material such as a highly viscous kerosene or diesel oil-soap gel mixed with coarse sand or fine gravel as the "propping" agent is pumped into the well cavity around the screen, a packer preferably having been set between the upper end of the screen and the casing in order to close the space between the tubing and casing. Another liquid such as oil is then pumped in on top of the fracturing mixture and a high pressure is exerted on the latter material through the medium of the oil to effect fracturing of the walls of the producing formation. The mixture of the fracturing liquid and the granular material remains in the fracture or fractures produced and a sufficient quantity of this material is used so that the annulus or annular space between the exterior of the screen and the formation walls will remain full of this mixture. A gel-breaking liquid is then forced down into the tubing string and this liquid passes outwardly through the screen perforations into the gel-containing granular material. This will gradually thin the gel and the thinned gel will be forced upwardly to the surface. After a period of a few hours, the gel will have been removed from the granular material, both in the cavity and also that material which has been forced into the fractures. The granular material will, of course, remain in these fractures as a propping material to prevent collapse of the formation and the granular material from which the fracturing liquid or gel has been removed will also remain within the cavity around the screen to provide a filter pack at that location. Much of the oil to be produced from the formation thus is drained from the formation through the granular material within the fractures whereupon it passes readily through the granular material around the screen, into the screen, and then upwardly to the surface. The granular material serves to strain out fine sand and silt which might otherwise pass with the oil into the screen.

For a better understanding of the invention, reference may be had to the accompanying drawing in which the single figure shows somewhat diagrammatically a vertical elevational section through a well which has been provided with a fracture in the producing formation and a filter pack of granular material around the screen in accordance with this invention.

In the accompanying drawing, an apparatus is illustrated which could be used in carrying out this well completion process. The bore hole or well 10 is shown as being provided with a casing 12 which extends down to the top of a producing formation 14. Within the well cavity 16 is a well screen or strainer 18 attached to the lower end of a tubing or production string 20. A packer 22 is shown as having been set by any suitable means in the lower portion of the casing above the top of the screen 18 so as to seal the annular space between the casing and the outer surface of the tubing 20. A smaller diameter pipe string 24 is shown extending down to the tubing 20 and is provided with a lower end opening outwardly through the side of the tubing below the packer 22. The arrangement of inner pipe string 20 within the tubing may, if desired, be as described in more detail in the U. S. Letters Patent No. 2,154,461, granted April 15, 1939, to L. A. Layne.

At the surface the tubing 20 is closed at the top by means of a suitable cover 25. Two pumps 26 and 28 are shown as connected through suitable piping and valves to the pipe string 24 and tubing 20. The arrangement of the valves will be described hereinafter.

In operation, assuming that the screen and packer have been set as shown in the drawing, valve 32 will be open and valves 30, 34, 36 and 42 closed, after which the pump 28 will be actuated to pump the mixture of fracturing gel-liquid and granular material downwardly through the pipe string 24 and into the well cavity 16 around the screen. As has been indicated, this fracturing liquid may comprise a low-penetrating and/or high viscosity fluid such as napalm gel. The operator usually has information as to the size of the cavity 16 and therefore can estimate the amount of the mixture which will be required to fill the cavity. After a sufficient amount of the mixture of the gel-fluid and the granular material has been placed in the cavity, another liquid such as oil will be pumped down through the same pipe string 24 by means of the pump 28. The pump pressure will then be increased until the formation wall has been fractured at one or more places as indicated at 38. During this operation, it is preferred that the valve 34 be open so that the oil under high pressure will fill the screen 18 and the tubing string 20. Thus, with the pressure the same, both inside and outside of the screen and tubing, no damage will be done to the equipment in the well due to the high pressure exerted during the fracturing operation. When the formation fractures, some of the granular material will, of course, pass into the crack or fracture with the gel-fluid while the annular space around the screen 18 will remain substantially full of the mixture of gel-fluid and granular material.

After the fracturing of the formation has taken place, the valves 32, 34 and 42 will be closed and the valves 30 and 36 will be opened, after which the pump 26 will be operated to pump the gel-breaker solution down through the tubing 20 and into the screen 18. This solution will pass outwardly through the perforations in the screen and will thin the gel substantially uniformly throughout the granular material within the well cavity 16. The gel-breaker solution will eventually also reach and thin the gel in the granular material within the fracture or fractures 38. During this period, the thinned gel will pass upwardly through the pipe string 24 and out of the well through the open valve 30. After the gel has been removed from the fractures and the well cavity, both the fractures and the cavity will, of course, remain full of the coarse sand or fine gravel. This granular material remaining within the fractures serves as a propping agent to prevent the formation from collapsing and the granular material remaining in the annulus or annular space between the formation walls and the exterior of the screen 18 will constitute an effective filter pack which, as indicated above, will serve to prevent fine sand and silt from passing into the scresen and up to the surface with the oil being produced. Much of the oil in the formation will pass into the fracture space 38 and then into the cavity, through the granular material in the cavity, and then into the screen and upwardly to the surface where it will pass outwardly through the outlet 40 containing valve 42 which will be open at that time. Depending upon the nature of the producing formation, additional oil may pass directly into the cavity 16 from the formation walls and this will supplement the oil reaching the screen from the fracture 38. The valves 30, 32, 34 and 36 will remain closed during the oil-producing operation.

It will be seen that a method has been provided whereby a well can be completed with hydraulic formation fracturing and a granular filter pack around the screen with but one passage of tools into the hole. If desired, when the well is ready for production, the entire tubing string 20, inner pipe 24 and packer 22 can be removed as by unscrewing the connection between the lower end of the tubing and the top of the screen, and this assembly can be replaced by a production string and a new packer as described in the aforementioned Layne Patent No. 2,154,461.

In case the formation 14 is a limestone or dolomite or is composed of limey sands or low solubility limestones, the gel-breaking solution may consist of an acid which will react with the formation in the manner well known in well acidizing procedures while the acid will also aid in breaking down the high viscosity of the gel. The well should, of course, be closed in for several hours before being placed on production so that the acid will have an opportunity to attack the formation and also to break down and thin the gel.

Again, instead of using acid as the gel-breaker solution, thickened acid may be used as the fracturing fluid when it is desired to fracture high solubility carbonate rock formations. Thickened acid serves very well as the carrier for the coarse sand or fine gravel used as the propping and filter medium.

Obviously, many other modifications and variations of the invention as hereinbefore set forth may be made without departing from the spirit and scope thereof and only such limitations should be imposed as are indicated in the appended claims.

I claim:

1. A method of completing a well in which a well screen attached to the lower end of a string of tubing is disposed within the well bore opposite the producing formation, which comprises introducing a mixture of granular material and a low penetrating liquid into the annulus between the screen and the walls of said formation, the interior of said screen being in fluid communication with said annulus, directing fluid under pressure to the mixture in the annulus and to the interior of the screen so as to exert a pressure on said liquid in said annulus sufficient to fracture said formation and to force some of said mixture into said formation, a quantity of said mixture of low penetrating liquid and granular material remaining in said annulus, while at the same time thereby maintaining substantially the same fluid pressure within the interior of said screen as is exerted on said liquid within said annulus during the aforesaid pressuring operation, subsequently passing a viscosity reducing liquid down said tubing into said screen and outwardly through the screen into contact with the mixture of low penetrating liquid and granular material remaining within said annulus and within said formation to reduce the viscosity of said low penetrating liquid therein thereby reducing the viscosity of said low penetrating liquid to leave granular material within said formation and within said annulus, the granular material remaining within said annulus to form a filter pack around the exterior of said screen through which the fluid to be produced from said formation will pass into screen and upwardly to the surface.

2. A method in accordance with claim 1 in which the low penetrating liquid comprises a thickened acid adapted to attack carbonate-containing rock formations.

3. A method of completing a well which comprises introducing a mixture of granular material and low penetrating liquid into the annulus between a well screen disposed within the well bore opposite the producing formation and the walls of said formation, the interior of said screen being in fluid communication with said annulus, directing a less viscous pressuring liquid under pressure into fluid contact with said low penetrating liquid within said annulus and into the interior of said screen to exert a pressure on said low penetrating liquid sufficient to cause said low penetrating liquid to fracture said producing formation and to force some of said mixture of low penetrating liquid and granular material into the formation, a quantity of said mixture of low penetrating liquid and granular material remaining in said annulus, while at the same time thereby maintaining substantially the same fluid pressure within the interior of said screen as is exerted on said low penetrating liquid within said annulus during the aforesaid fracturing operation, subsequently passing a viscosity reducing liquid down said tubing into said screen and outwardly through the screen into contact with the mixture of said low penetrating liquid and granular material within said annulus and within said producing formation to reduce the viscosity of the low penetrating liquid therein thereby by reducing the viscosity of said low penetrating liquid leaving granular material within said formation and within said annulus to form a filter pack around the exterior of said screen through which the fluid to be produced from said formation will pass into said screen and upwardly to the surface.

4. A method of completing a well in which a well screen is disposed in the well bore opposite the producing formation to provide an annulus between said well screen and the walls of said formation, the interior of said screen being in fluid communication with said annulus, which comprises introducing into said annulus a mixture of granular material and a fracturing liquid in an amount at least sufficient to occupy said annulus, directing fluid under pressure to the mixture in the annulus and to the interior of the screen so as to exert a pressure on said liquid within said annulus sufficient to fracture said formation, while at the same time thereby maintaining substantially the same fluid pressure within the interior of said screen as is exerted on said fracturing liquid within said annulus during the aforesaid fracturing operation, to force some of said mixture comprising fracturing liquid and granular material into said formation and leaving within said annulus granular material to form a filter pack between the walls of said formation and said screen.

5. A method in accordance with claim 4 wherein the interior of said screen is occupied by said fracturing liquid.

6. A method of completing a well in which a well screen is disposed in the well bore opposite the producing formation to provide an annulus between said well screen and the walls of said formation, the interior of said screen being in fluid communication with said annulus, which comprises introducing into said annulus a mixture of granular material and a low penetrating liquid in an amount at least sufficient to occupy said annulus, directing fluid under pressure to the mixture in the annulus and to the interior of the screen so as to exert a pressure on said liquid within said annulus sufficient to force some of said mixture comprising low penetrating liquid and granular material into said formation while at the same time thereby maintaining substantially the same fluid pressure within the interior of said screen as is exerted on said low penetrating liquid within the annulus during the aforesaid pressuring operation, and leaving within said annulus granular material to form a filter pack between the walls of said formation and said screen.

References Cited in the file of this patent
UNITED STATES PATENTS

| | | |
|---|---|---|
| 2,154,461 | Layne | Apr. 18, 1939 |
| 2,354,570 | Benckenstein | July 25, 1944 |
| 2,596,137 | Fast | May 13, 1952 |
| 2,596,843 | Farris | May 13, 1952 |

OTHER REFERENCES

World Oil, February 1, 1951, pages 133–136, 138, and 148.